(12) United States Patent
Kohl et al.

(10) Patent No.: US 8,931,750 B2
(45) Date of Patent: Jan. 13, 2015

(54) CHANGE OF SPRING FORCE BY MEANS OF LEVERS

(75) Inventors: Josef Kohl, Hirschau (DE); Johann Deml, Thanstein (DE)

(73) Assignee: Grammer AG (DE)

(*) Notice: Subject to any disclaimer, the term of this patent is extended or adjusted under 35 U.S.C. 154(b) by 325 days.

(21) Appl. No.: 12/826,232

(22) Filed: Jun. 29, 2010

(65) Prior Publication Data
US 2011/0001033 A1 Jan. 6, 2011

(30) Foreign Application Priority Data

Jul. 2, 2009 (DE) .................. 10 2009 031 411
Sep. 3, 2009 (DE) .................. 10 2009 040 010

(51) Int. Cl.
*B60N 2/54* (2006.01)
*B60N 2/50* (2006.01)

(52) U.S. Cl.
CPC .............. *B60N 2/502* (2013.01); *B60N 2/509* (2013.01); *B60N 2/505* (2013.01); *B60N 2/508* (2013.01); *B60N 2/544* (2013.01)
USPC ...... 248/588; 248/592; 248/595; 297/344.12; 297/344.15

(58) Field of Classification Search
CPC ........ B60N 2/505; B60N 2/502; B60N 2/508; B60N 2/509; B60N 2/544
USPC ............. 248/588, 564, 421, 575, 592–595; 267/131, 140.11; 297/344.12, 344.15, 297/338
See application file for complete search history.

(56) References Cited

U.S. PATENT DOCUMENTS

| | | | | |
|---|---|---|---|---|
| 4,611,783 A | * | 9/1986 | Sakamoto | 248/588 |
| 4,640,488 A | * | 2/1987 | Sakamoto | 248/564 |
| 5,957,426 A | * | 9/1999 | Brodersen | 248/588 |
| 2010/0102493 A1 | * | 4/2010 | Deml et al. | 267/140.11 |
| 2011/0024958 A1 | * | 2/2011 | Deml et al. | 267/131 |

FOREIGN PATENT DOCUMENTS

| | | |
|---|---|---|
| DE | 1916403 | 10/1970 |
| DE | 3227858 | 1/1984 |
| DE | 3242287 | 5/1984 |

OTHER PUBLICATIONS

Office Action issued May 3, 2012 for Application No. 2010102266849 filed Jul. 1, 2010 and Published Mar. 16, 2011.
Office Action issued Jan. 14, 2013 for Application No. 2010102266849 filed Jul. 1, 2010 and Published Mar. 16, 2011.

* cited by examiner

*Primary Examiner* — Tan Le
(74) *Attorney, Agent, or Firm* — Sheridan Ross P.C.

(57) ABSTRACT

The invention concerns a spring system for use in vehicles for adjustment of the suspension characteristics, comprising at least one spring element to provide a spring force, an upper and a lower arrangement area to receive forces, a scissors-type frame arranged between the upper and the lower arrangement area for coupling the spring element with at least one force acting on one of the arrangement areas. According to the invention the spring element is coupled with a deflection means to influence the spring force and between the deflection means and a segment of the scissors-type frame an active connection can be created to transmit forces.

18 Claims, 7 Drawing Sheets

CHANGE OF SPRING FORCE BY MEANS OF LEVERS

CROSS REFERENCE TO RELATED APPLICATIONS

This application is a convention application of German Application Serial Number 10 2009 031 411.3, filed Jul. 2, 2009 and German Patent Application No. 10 2009 040 010.9, filed Sep. 3, 2009, which applications are hereby incorporated by this reference in their entirety.

BACKGROUND OF THE INVENTION

The invention concerns a spring system for use in vehicles, in particular for vehicle seats and/or vehicle cabs, according to the preamble of claim 1.

Spring systems, in particular for vehicle seats, are known in many variants. For example, very often a pneumatic spring is arranged between two suspension parts, namely a lower part and an upper part on which the actual vehicle seat is mounted, and in addition a gas damper element is fitted in order to absorb the vibration movement which can be initiated both from above by the driver and from below by the chassis. Such spring systems require a complex control of the air spring and the damper and are therefore cost- and time-intensive to produce and maintain.

Such spring systems also have the disadvantage that after a certain time they require repair, and where applicable the air springs and/or dampers must be replaced. Furthermore the spring systems known from the prior art are often very complex to adjust.

Consequently the present invention in based on the object of preparing a spring system for use in vehicles which can not only be produced economically but also is less time intensive to maintain and is simple in construction. Furthermore the spring system is easier to handle than spring systems known from the prior art.

This object is achieved according to the invention by the object of claim 1.

SUMMARY OF THE INVENTION

The main aspect of the invention is that in a spring system for use in vehicles for adjusting suspension characteristics at least one spring element is provided which supplies a spring force, wherein between an upper and a lower arrangement area, both of which serve to absorb forces, a scissors-type frame is provided to couple the spring element with at least one force acting on one of the application areas. According to the invention the spring element is coupled with a deflection means to influence the spring force, and between the deflection means and a segment of the scissors-type frame an active connection can be created to transmit forces.

This solution is advantageous in relation to devices known from the prior art as it simple and cheap to produce and easy to operate.

As a active connection can be created to transmit forces between the deflection means and at least one segment of the scissors-type frame, different directions for the spring force emitted by the spring element can be set depending on the momentary position of the segment of the scissors-type frame. Since a first end of the spring element and the deflection means are coupled together at a connection point and for example the deflection means is a lever arm which at its other end is attached to an axis on the segment, different deflection positions of the deflection means depending on the momentary height setting of the segment of the scissors-type frame can generate different alignments of the spring force direction, leading to a different suspension characteristic. As a result an optimum vibration change can be achieved irrespective of the weight of the driver using the driver's seat.

The coupling between the spring element and the deflection means allows, in case of a deflection of the deflection means, a force application of the spring element and vice versa. Furthermore the connecting point is arranged at a defined distance from a rotary axis of the deflection means as already stated. This is advantageous as despite the same connection point, depending on the position of the deflection means, different moments or lever ratios can be generated. Since the effective lever depends on the direction of the spring force and hence on the momentary deflection of the deflection means. A line oriented perpendicular to the direction of the spring force passing through the rotary axis of the deflection means gives the effective lever arm and hence the effective torque.

Preferably here the angle between the deflection means and the extent or course of the segment of the scissors-type frame is firmly set irrespective of the momentary deflection angle of the deflection means. This means that if the segment is in a flatter position i.e. the driver's seat is arranged at a lower position, the deflection means is deflected to a lesser extent than if the driver's seat is in its upper position, and as a result the segment has a greater incline to the horizontal and hence the deflection means has a greater deflection.

Advantageously the active connection is located at a distance from at least one of the arrangement areas.

In a preferred embodiment of the present invention, between a first rotary point of a segment of the scissors-type frame and a plane of the arrangement area is a first distance which is greater than a second distance of a further rotary point of a segment of the scissors-type frame from a plane of the corresponding arrangement area. This embodiment is advantageous since it gives different distances due to connections arranged on different planes between the segments of the scissors-type frame and individual mountings. This leads at least partly to a vibration decoupling between for example the upper and the lower arrangement area.

In one application of the device to vehicle seats, the upper arrangement area corresponds to an upper seat area and the lower arrangement area corresponds to a lower seat area. The lower arrangement area or lower seat area is attached to the vehicle and the upper arrangement area or upper seat area is movable in relation to the vehicle at least in the vehicle height direction corresponding to the seat height direction.

The spring system is also attached to the vehicle when it is arranged or used between a vehicle cab and the vehicle or vehicle frame. In such an embodiment the vehicle cab can be displaced in the vehicle height direction in relation to the vehicle frame or vehicle.

Also combined arrangements are conceivable in which the cab is movable in the height direction and on or in the cab a seat fitted with a spring system is provided which is also movable in the vehicle height direction.

It is also conceivable for the deflection means and spring element to be coupled in such a way that the connection point is provided variably on the deflection means and can be fixed in any position as required. The closer the connection point lies to the corresponding arrangement area, the higher the possible moment that can be transmitted by the spring element to the scissors-type frame for the same spring force.

In a further preferred embodiment of the present invention, in a first operating state the deflection of the deflection means causes a deflection of the scissors-type frame. This is advantageous as the scissors-type frame can be modified by the deflection of the deflection means. It is also conceivable that the deflecting means is deflected by deflection of the scissors-type frame.

In a further preferred embodiment of the present invention, at least one segment of the scissors-type frame has a first section that is shorter than a second section of the segment. This is advantageous as also at least partly a vibration decoupling is possible of the vibrations from the individual segment sections on the basis of different resonance sections. Furthermore such an arrangement causes different forces because of the different lever ratios on the different mountings. This is advantageous as, depending on the alignment of the spring system, the desired or required forces can be provided for the application of force to the spring element.

In a further preferred embodiment of the present invention, on deflection of the scissors-type frame the maximum deflection of the connection point is preferably less than the maximum deflection of the first section of the segment of the scissors-type frame and particularly preferably the maximum deflection of the connection point is smaller than the maximum deflection of the second section of the segment of the scissors-type frame. This is advantageous as despite the relatively great deflection of the entire system, a substantially smaller deflection of the spring element is possible. It is therefore possible for example to provide a comparatively small or short spring element. The term deflection here means the maximum travel covered by the section which moved fastest, in terms of angular speed, of the first or second section of the segment of the scissors-type frame or connection point.

In a further preferred embodiment of the present invention, in the first operating state the deflection means is connected with the scissors-type frame and locked in relation to this. This embodiment is advantageous as in this configuration the forces of the spring element can be transmitted via the deflection means to the scissors-type frame or vice versa. A further embodiment is also conceivable in which the deflection means and scissors-type frame are formed as one piece, whereby admittedly no adjustment of the spring force is possible but lower production costs can be achieved. The term "one piece" in this case also includes components connected together non-releasably i.e. by welding connected parts.

In a further preferred embodiment of the present invention, between the segment of the scissors-type frame and a straight line defined by a mounting point at which the deflection means is in contact with the segment of the scissors-type frame and the connecting point is a fixed angle in the locked state.

This embodiment is advantageous as the angle between the straight line and the scissors-type frame in the locked state cannot be changed and hence in the first operating state no undesirable spring force adjustments can take place.

In a further preferred embodiment of the present invention, in a second operating state the deflection means can be moved in relation to the scissors-type frame from a first locked position to a second locked position. This is advantageous as changing the position of the deflection means allows a change or adjustment of the spring force. The position of the deflection means can be set and/or fixed or locked arbitrarily in relation to the lever element. Also it is conceivable and advantageous that for a constant lever ratio i.e. a constant distance between the applied spring force and the point about which the moment acts, a change of spring force is possible.

In a further preferred embodiment of the present invention the deflection means is connected with a lever element, wherein the lever element can be designed as a rod and plate, hollow, of solid material and with any cross section e.g. round, rectangular, polygonal etc. The lever element is furthermore rotatably connected with an element which is also rotatably connected with the segment of the scissors-type frame.

This embodiment is advantageous as due to the lever ratios occurring, a deflection of the scissors-type frame in the height direction is again possible which is greater than the deflection of the spring element.

Furthermore it is advantageous that due to the arrangement described above, a connection exists between the lever element, the deflection means and the segment of the scissors-type frame. The further element rotatably connected with the scissors-type frame allows an interaction of these components without stresses occurring in the system. Preferably the further element is also connected rotatably with the lever element. Here however it is also conceivable that in a first operating state, the deflection means is fixed in relation to the lever element i.e. the movement of the lever element causes a deflection of the deflection means and vice versa. The deflection means in a second operating state is also preferably movable in relation to the lever element i.e. can be moved from a first fixed or locked position to a further fixed or locked position. In a further embodiment the deflection means and lever element are formed as one piece, wherein the term "one piece" should also be understood as non-releasable in the sense discussed above.

In a further preferred embodiment of the present invention, the lever element and deflection means are arranged rotatably about an axis. This axis is spaced from any further axis about which at least one segment of the scissors-type frame is arranged rotatably. This is advantageous as the deflection means does not act on or is not arranged directly on a segment of the scissors-type frame but through the lever element, any arbitrary position at the respective segment of the scissors-type frame can be assumed for the application or reception of force. Due to the length of the lever element and spring element therefore widely differing force and lever conditions can be expected.

In a further preferred embodiment of the present invention, a second end of the spring element is arranged on a segment of the scissors-type frame, the upper or the lower arrangement area or the vehicle frame. This is advantageous as the spring element, on displacement of the upper arrangement area in the height direction, can also be moved fully in the height direction or the spring element can be deflected merely in its length and swiveled about an axis at the point of attachment of its second end.

In a further preferred embodiment of the present invention, the spring element is arranged preferably horizontally between the segments of the scissors-type frame. This is advantageous as the spring element is arranged protectedly i.e. for example surrounded or enclosed by the upper part of a vehicle seat. The spring element can here preferably be designed as a gas spring, a plastic spring, a rubber spring, a metal spring such as e.g. a coil spring, a torsion spring, a leg spring or a combination of these or further spring elements.

In a further preferred embodiment of the present invention, the deflection means can be operated and/or fixed or locked manually, mechanically, electrically, pneumatically or hydraulically. This is advantageous since the suitable operation mode or suitable combination of these operating modes can be provided for locking and operation, i.e. a change of position of the deflection means depending on the manner of use of the device, comfort requirement and available energy supply system.

In a further preferred embodiment of the present invention, the deflection means is formed plate-like at least in sections and/or preferably in sections rod-like and particularly preferably lever-like. This is advantageous as such plate-like and/or rod-like and lever-like means are simple, accurate and economic to produce.

Further preferred embodiments arise from the sub claims.

The benefits and suitabilities are described in the description below in conjunction with the drawings.

BRIEF DESCRIPTION OF THE DRAWINGS

These show.

DETAILED DESCRIPTION OF THE INVENTION

Figure 1:
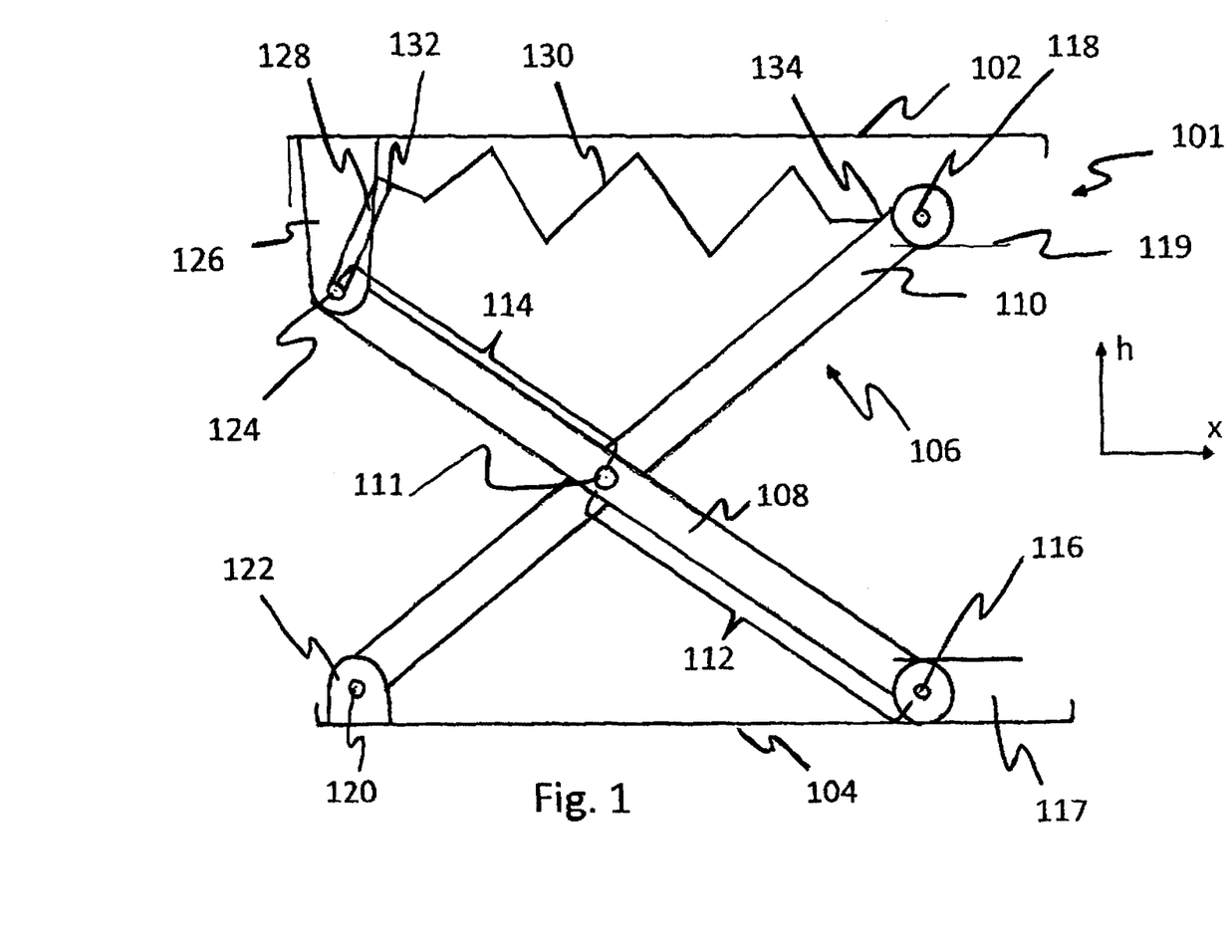
FIG. 1 an extended state of the scissors-type frame with a deflection means provided on the scissors-type frame and shown in a first configuration.

FIG. 1 shows a diagrammatic view of a lower section of a vehicle seat or a vehicle cab of a vehicle, wherein the spring system 101 can be set to oscillate in the vertical direction. The spring system 101 has an upper arrangement area 102 and a lower arrangement area 104 which are connected together via a scissors-type frame 106. The scissors-type frame 106 comprises a first segment 108 and a second segment 110 that are connected together via a central axis 111.

FIG. 1 shows that the first segment 108 has a first section 112 that is longer than a second section 114. It is however also conceivable that the second section 114 is longer than the first section 112 or the two sections 112, 114 are the same length.

The first segment 108 has a first axis 116 that can be displaced in the x-direction. It is conceivable that a wheel is provided on the first axis 116 mounted movable in the lower bearing 117 or a slide element is provided on the first axis 114 mounted sliding in the lower bearing 117. The second axis 118 and upper bearing 119 for example can also be produced corresponding to the statements on the first axis 116 and the lower bearing 117.

The second segment 110 is mounted next to bearing 119 and rotatable about a third axis 120 in a lower rotary bearing 122 that is provided on the lower arrangement area 104. The first segment 108 in the upper arrangement area 102 is mounted about a fourth axis 124 provided in an upper rotary bearing 126. The upper rotary bearing 126 is formed longer in the height direction h than for example the lower rotary bearing 122, whereby the fourth axis 124 is spaced further from a plane of the upper arrangement area 102 than the second axis 118. Also the deflection means 128 is arranged rotatable about the fourth axis 124 and is movable from a first position fixed in relation to the first segment 108 into a second position fixed in relation to the first segment 108.

On the deflection means 128 shown as a lever in FIG. 1 a spring element 130 is mounted at a connection point 132. The second end 134 of the spring element 130 is attached according to the depiction in FIG. 1 on the second segment 110 of the scissors-type frame 106, wherein the second end 134 of the spring element 130 can also be attached to the upper arrangement area 102. The second end 134 of the spring element 130 is preferably mounted rotatable, it is however also conceivable that the second end 134 of the spring element 130 is firmly clamped.

Figure 2:
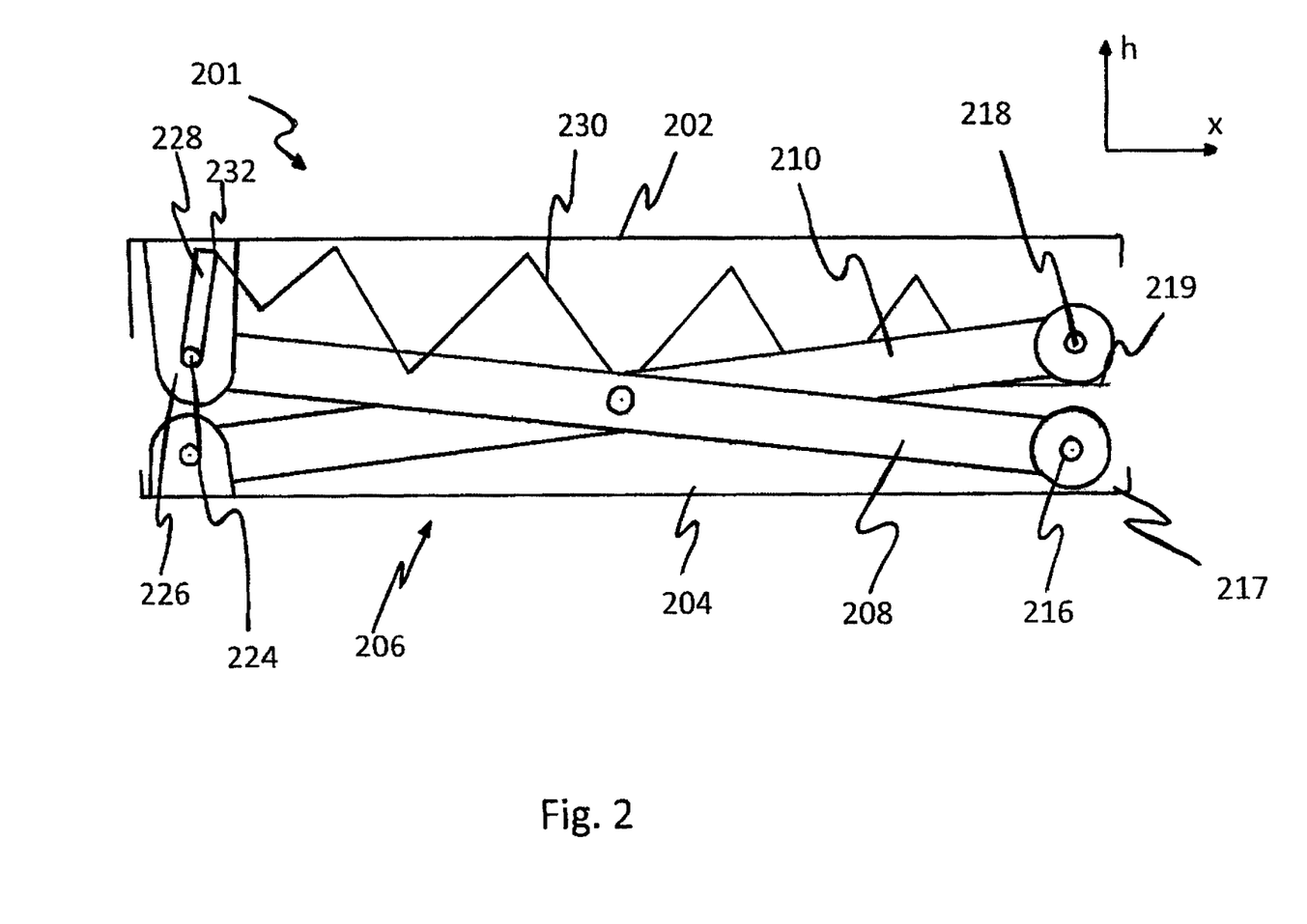
FIG. 2 a retracted state of the scissors-type frame and a deflection element which is also arranged on the scissors-type element and has the same angle to the scissors-type element as is the case in FIG. 1.

FIG. 2 shows a spring system 201 in a position of minimised or reduced height. In this position the upper arrangement area 202 is physically very close to the lower arrangement area 204. The scissors-type frame 206 therefore in comparison with the scissors-type frame in FIG. 1 extends less in the height direction h but further in direction x. Because of the modified position of the device 206 in relation to FIG. 1, the first segment 208 of the scissors-type frame 206 and the deflection means 228 can be rotated about the fourth axis 224 at a constant angle, whereby the spring element 230 is deflected in the x-direction.

Figure 3:
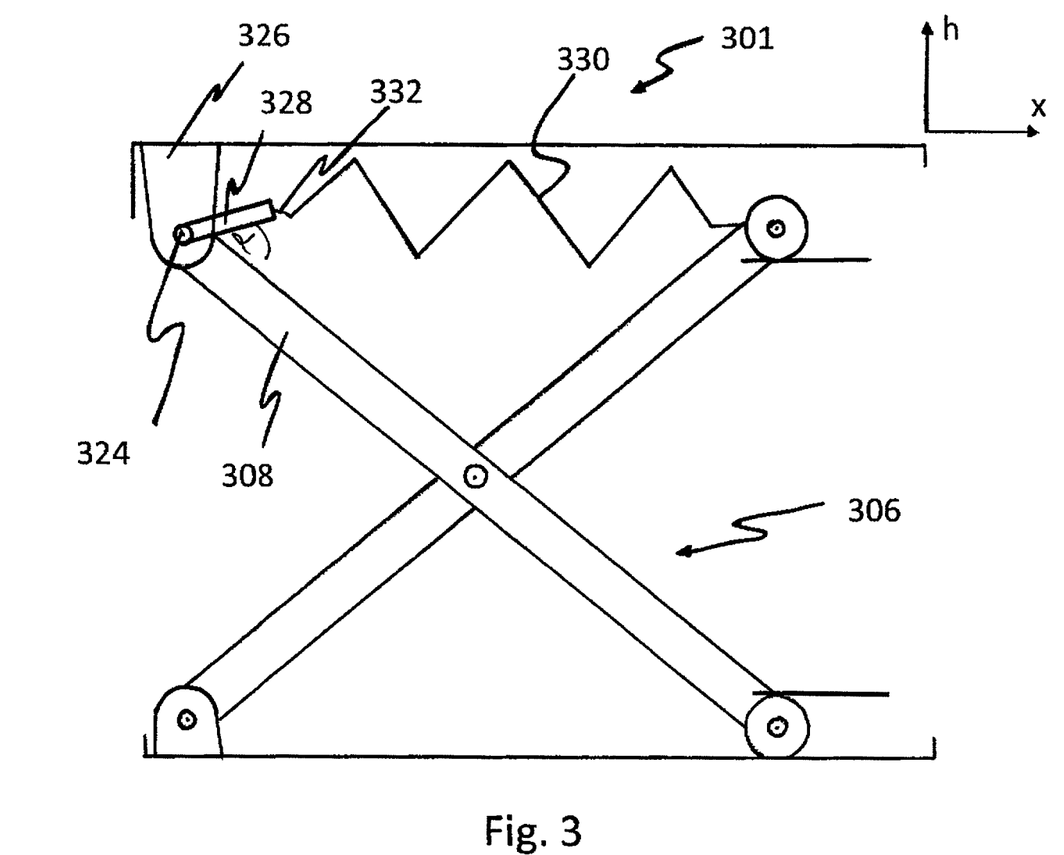
FIG. 3 an extended position of the scissors-type frame with a deflection means arranged on the scissors-type frame and shown in a further configuration.

FIG. 3 shows the scissors-type frame 306 according to the positioning known from FIG. 1, wherein the angle between the first segment 308 of the scissors-type frame 306 and the deflection means 328 changes from the position shown in FIG. 1 i.e. is more acute. The deflection means 328 is thus rotated about the fourth axis 324 such that the connecting point 332 at which the spring element 330 is connected with the deflection means 328 causes a compression or release of the spring element 330.

Figure 4:
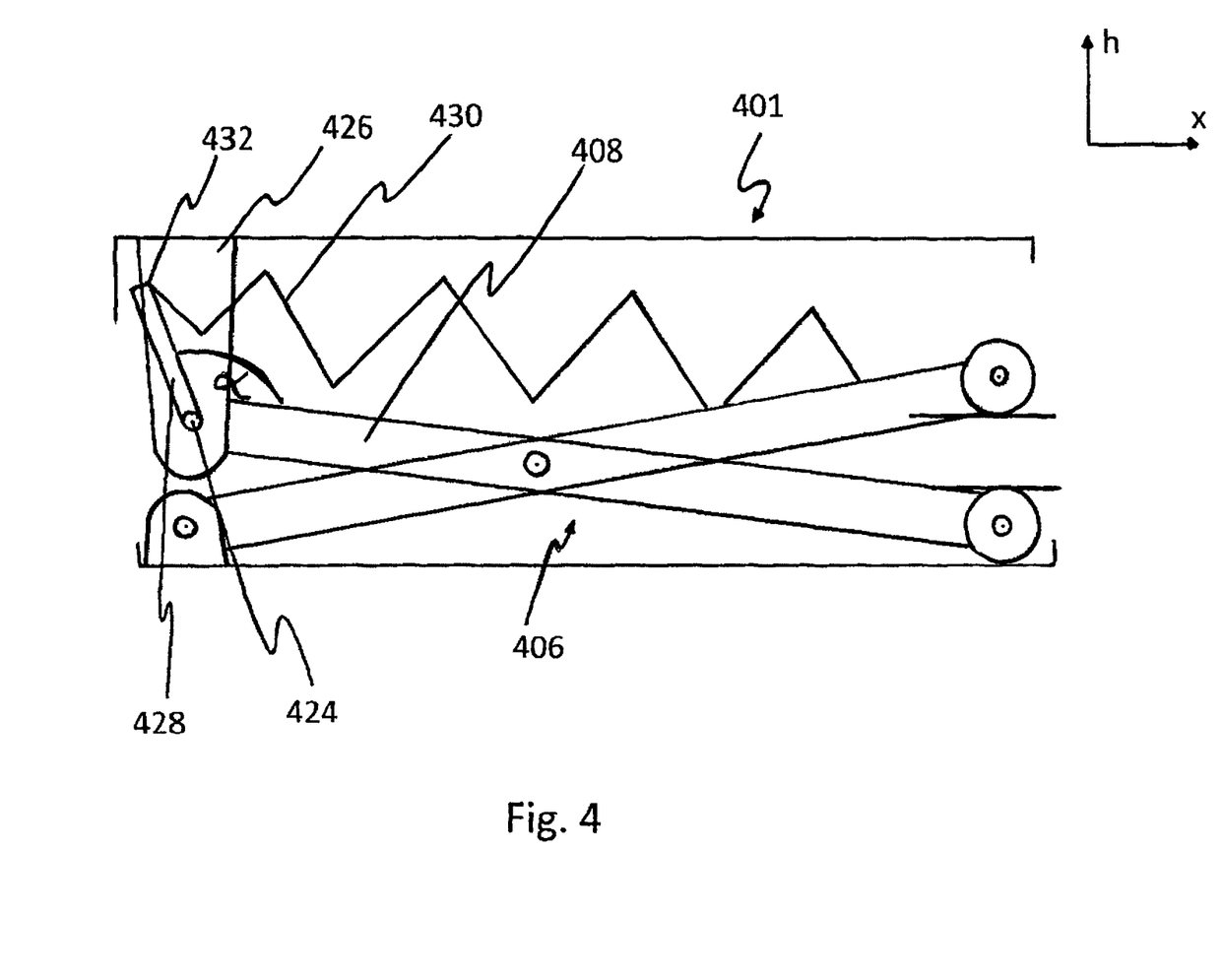
FIG. 4 an arrangement showing the deflection means in a further configuration in comparison with FIG. 2.

FIG. 3 and FIG. 4 show different height positions of the vehicle seat which are characterised by different deflections of the deflection means in relation to the segment of the scissors-type frame. For example the deflection means 328 can be deliberately modified in position in a lowered position of the vehicle seat as shown in FIG. 4 in order to achieve a different angle α between the extent of the deflection means 428 and the segment 408 of the scissors-type frame. This has the effect that the spring element 430 receives a stronger force and hence a greater effect can be achieved in the vibration reduction of the entire vehicle seat.

FIG. 4 shows a further depiction of a spring system 401 in a lowered height configuration. In comparison with the view shown in FIG. 2, the lever 428 is rotated about the axis 424 such that the angle between the first segment 408 of the scissors-type frame 406 and the deflection means 428 is greater. Due to this greater angle between the first segment 408 and the deflection means 428, the spring element 430 is deflected more in comparison with the spring element 230 known from FIG. 2, whereby the spring element 430 shown in FIG. 4 exerts a different force from the spring element 230 shown in FIG. 2.

Figure 5:
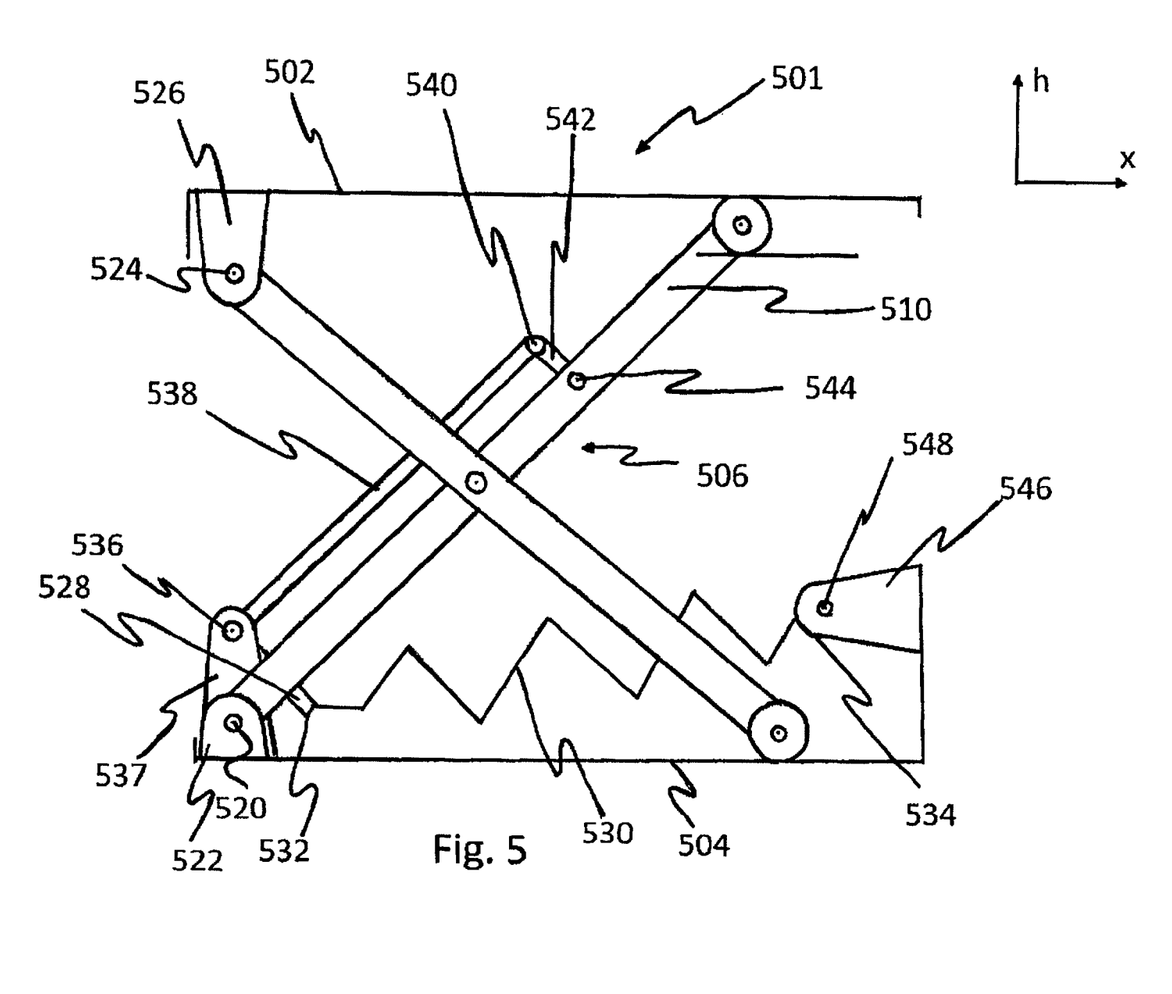
FIG. 5 a scissors-type frame and a deflection means which is mounted at a distance from the scissors-type frame.

FIG. 5 shows a further embodiment of a spring system 501, where at the lower arrangement area 504 is mounted a lower rotary bearing 522 in which the scissors-type element 506 is mounted merely rotatably. The upper rotary bearing 526 as in FIG. 4 is also formed longer in height direction h than for example the lower rotary bearing 522, wherein it is conceivable that the upper rotary bearing 526 can also be produced in the same length as the lower rotary bearing 522. Furthermore it is conceivable that the lower rotary bearing 522 is formed longer than the upper rotary bearing 526.

Arranged on the deflection means 528 is a spring element 530 at a connecting point 532. The spring element 530 furthermore has a second end 534 which is mounted preferably rotatably in a holder 548 of the spring element 530. The holder 548 of the spring element 530 is in a further bearing 546 connected with the lower arrangement area 504. In comparison with the arrangement of the other bearings, the further bearing 546 is arranged in the horizontal direction, wherein an arrangement of the further bearing 546 in the vertical direction is also conceivable, where the other bearings can also be arranged horizontally accordingly.

The deflection means 528 can be rotated about a fifth axis 536 provided by a bearing of the deflection means 537. Also arranged rotatably on the fifth axis 536 is the lever element 538. The deflection means 528 and the lever element 538 are actively connected with each other i.e. the angle included between them can be modified. It is also conceivable that the angle between the lever element 538 and the deflection means 528 is fixed, as the deflection means 528 can also be connected non-releasably with the lever element 538.

Arranged on the lever element 538 is a sixth axis 540 about which can be rotated a further element 542 that is rotatably connected by means of a seventh axis 544 with the second segment 510. A force application in the spring system 501 via the upper arrangement area 502 or the lower arrangement area 504 which leads to a change of distance between the upper arrangement area 502 and the lower arrangement area 504, at the same time causes a change in length of the spring element 513 or vice versa.

Figure 6:
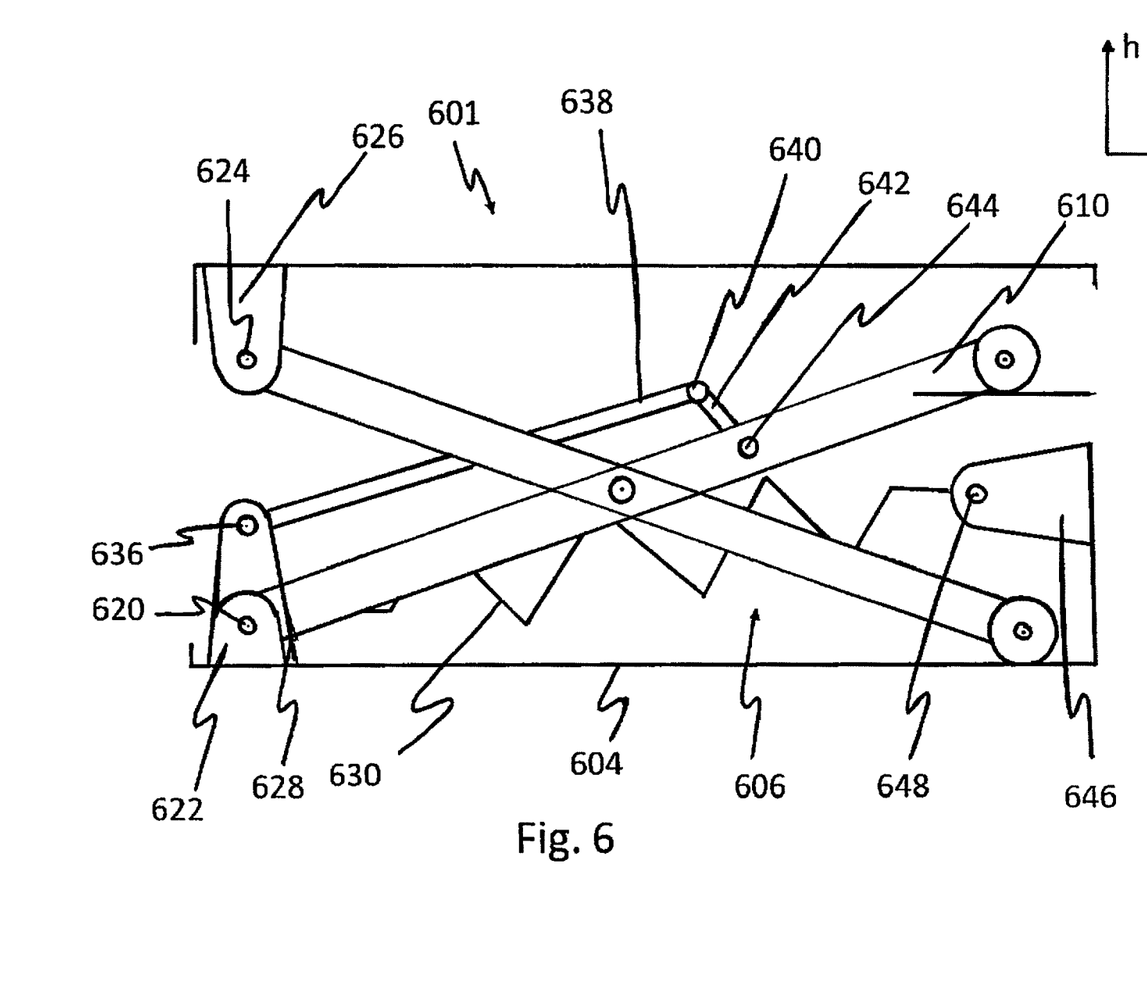
FIG. 6 the device known from FIG. 5 in a further configuration.

FIG. 6 shows in comparison with FIG. 5 a modified height h of the spring system 601 whereby it is clear that a length change of the spring element 630 has occurred. It is also clear from FIG. 6 that in comparison with FIG. 5, a provided or theoretical line at right angles from the second segment 610 into the centre of the fifth axis 636 is longer than is the case in FIG. 5. Furthermore in FIG. 6 an arranged or theoretical line at right angles on the second segment 610, protruding into the centre of the sixth axis 640, is shorter than is the case in FIG. 5.

Figure 7:
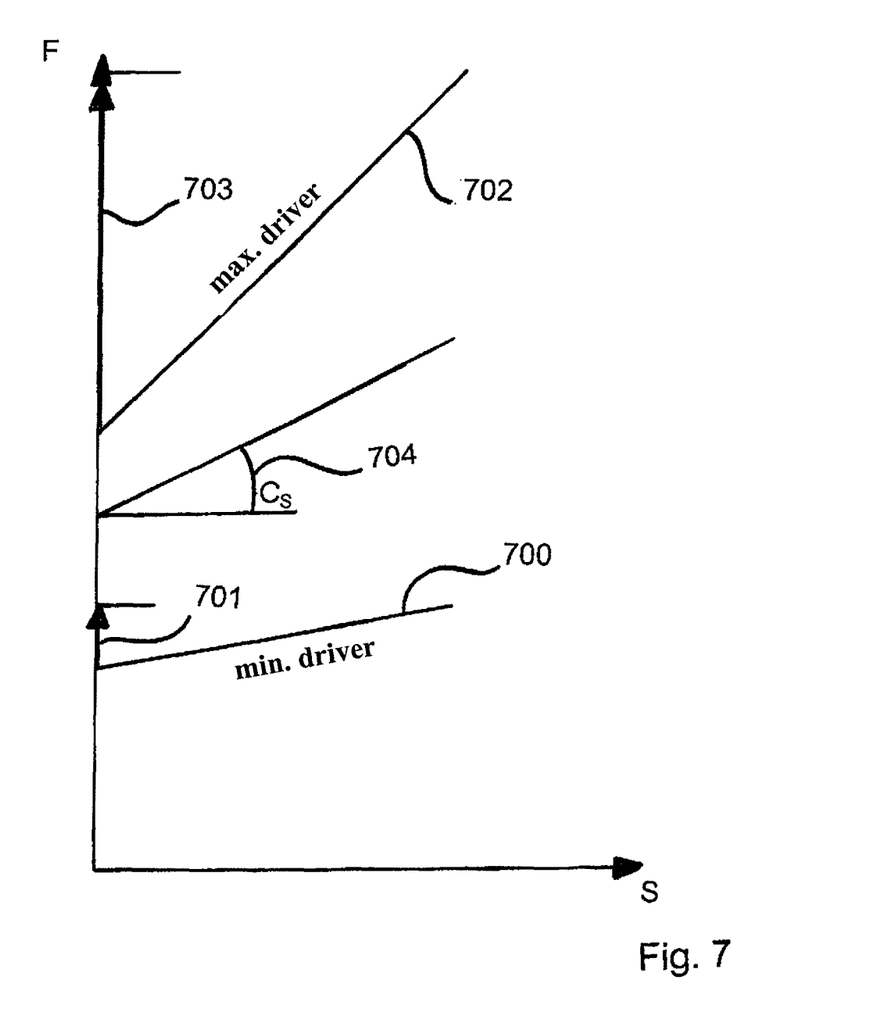
FIG. 7 in a graph, the force-travel curves for the device according to the invention.

FIG. 7 depicts in a graph a force-travel curve for drivers of different weights using a vehicle seat with the spring system according to the invention. The ordinate shows the spring force of the spring system and the abscissa the associated travel of the spring system in the height direction. A driver with a low weight produces curve 700 with a load spring force 701 in relation to the associated vibration travel. Such a light-weight driver also experiences as good a vibration reduction as a heavy driver, whose curve is shown marked 702 with associated spring force 703.

Because of the modified deflection of the spring element which is achieved by the differently positioned deflection means as a function of the momentary position of the scissors-type frame, a different spring force is obtained with reference numerals 701 and 703 as a function of the driver's weight. A strong compression of the spring system with associated seat would generate a strong counter spring force according to numeral 703, where in contrast a weaker extension/compression would provoke a weaker counter spring force 701.

The spring characteristics 700 and 702 have different gradients as a function of the weight of the driver and the counter spring force provoked, wherein the gradients are arranged at different angles 704 to the horizontal. Both the angle size and the mass m of the driver are used in a vibration frequency formula $$f = \frac{1}{2\pi}\sqrt{\frac{m}{C_s}}.$$

The mutual dependency of the mass of the driver and the angular deflection of the characteristics gradient are shown according to this formula. This shows that good vibration reduction is possible both for a lightweight and a heavyweight driver.

All features disclosed in the application documents are claimed as essential to the invention where novel individually or in combination in relation to the prior art.

LIST OF REFERENCE NUMERALS

101, 201, 301, 401, 501, 601 spring system
102, 202, 502 upper arrangement area
104, 204, 504, 604 lower arrangement area
106, 206, 306, 406, 506, 606 scissors-type frame
108, 208, 308, 408 first segment of scissors-type frame
110, 210, 510, 610 second segment of scissors-type frame
111 centre axis
112 first section of segment
114 second section of segment
116, 216 first axis
117, 217 lower plain bearing/roller bearing
118, 218 second axis
119, 219 upper plain bearing/roller bearing
120, 520, 620 third axis/second rotation point/application point
122, 522, 622 lower rotary bearing
124, 224, 324, 424, 524, 624 fourth axis/first rotation point/application point
126, 226, 326, 426, 526, 626 upper rotary bearing
128, 228, 328, 428, 528, 628 deflection means/lever
130, 230, 330, 430, 530, 630 spring element
132, 232, 332, 432, 532 connection point
134, 534 second end of spring element
536, 636 fifth axis
537 bearing of deflection means
538, 638 lever element
540, 640 sixth axis
542, 642 further element
544, 644 seventh axis
546, 646 further bearing
548, 648 holder of spring element
700, 702 curve
701, 703 spring force
704 different angle

What is claimed is:

1. A spring system for use in vehicles to adjust suspension characteristics, the spring system comprising:
at least one spring element to provide a spring force;
an upper arrangement area and a lower arrangement area to absorb forces;
a scissors-type frame including first and second separate scissor arm segments rotatably connected to each other by a central axis and arranged between the upper arrangement area and the lower arrangement area, wherein the scissors-type frame couples the at least one spring element with at least one force acting on one of the arrangement areas;
a deflection means having a first end portion and a second end portion, wherein the first end portion of the deflection means is directly connected to the first scissor arm segment and the second end portion of the deflection means is directly connected to a first end portion of the at least one spring element,
wherein the at least one spring element coupled with the deflection means influences the spring force, between the deflection means and one of the scissor arm segments of the scissors-type frame an active connection can be created to transmit forces, and an angle between the deflection means and the extent or course of the first scissor arm segment of the scissors-type frame is fixedly set irrespective of the momentary deflection of the deflection means, and wherein a second end portion of the at least one spring element is directly connected to the second scissor arm segment of the scissors-type frame.

2. The spring system according to claim 1, wherein the first end portion of the at least one spring element and the first end portion of the deflection means are coupled together at a connection point arranged at a defined distance from an axis of the deflection means.

3. The spring system according to claim 2, wherein as a function of a momentary position of the deflection means, effective lever lengths of different lengths can act between the axis of the deflection means and the connecting point depending on the momentary alignment of the spring force of the spring element.

4. The spring system according to claim 1, wherein in a first operating state, a deflection of the scissors-type frame causes a deflection of the deflection means.

5. The spring system according to claim 1, wherein an active connection between the deflection means and a segment of the scissors-type frame transmits forces, the active connection being located at a distance from one arrangement area.

6. The spring system according to claim 5, wherein a distance between a first rotation point of a segment of the scissors-type frame and a plane of an arrangement area is greater than the distance of a further rotation point of a segment of the scissors-type frame from a plane of the corresponding area.

7. The spring system according to claim 1, wherein at least one segment of the scissors-type frame has a first section that is larger than a second section of the segment.

8. The spring system according to claim 1, a maximum deflection of a connection point of the scissors-type frame is less than a maximum deflection of a first section of the segment of the scissors-type frame.

9. The spring system according to claim 1, wherein in a first operating state, the deflection means is connected with the scissors-type frame and remains in a locked state.

10. The spring system according to claim 9, wherein in the locked state, a fixed angle exists between the segment of the scissors-type frame and a straight line defined by an attachment point at which the deflection means is in contact with the segment of the scissors-type frame, and the connection point.

11. The spring system according to claim 9, wherein in a second operating state, the deflection means is moved in relation to the scissors-type frame from a first locked position to a second locked position.

12. The spring system according to claim 1, wherein the second end portion of the at least one spring element is arranged on a segment of the scissors-type frame, the upper arrangement area, the lower arrangement area, or a vehicle frame.

13. The spring system according to claim 1, wherein the at least one spring element is arranged horizontally between the first and second segments of the scissors-type frame.

14. The spring system according to claim 1, wherein the deflection means is activated and locked manually, mechanically, electrically, pneumatically or hydraulically.

15. The spring system according to claim 1, wherein the deflection means is formed at least in one of plate-like, rod-like, and lever-like sections.

16. The spring system according to claim 1, wherein the deflection means is locked manually, mechanically, electrically, pneumatically, or hydraulically.

17. The spring system according to claim 1, wherein a maximum deflection of the connection point of the scissors-type frame is less than a maximum deflection of a second section of the segment of the scissors-type frame.

18. The spring system according to claim 1, wherein the spring element is compressed or released when the deflection means is rotated about an axis of a connecting point at which the spring element and the deflection means are connected.

* * * * *